J. AYRES & A. C. DECKER.
Machine for Barbing Wire.

No. 235,331.

2 Sheets—Sheet 1.

Patented Dec. 14, 1880.

J. AYRES & A. C. DECKER.
Machine for Barbing Wire.
No. 235,331. Patented Dec. 14, 1880.
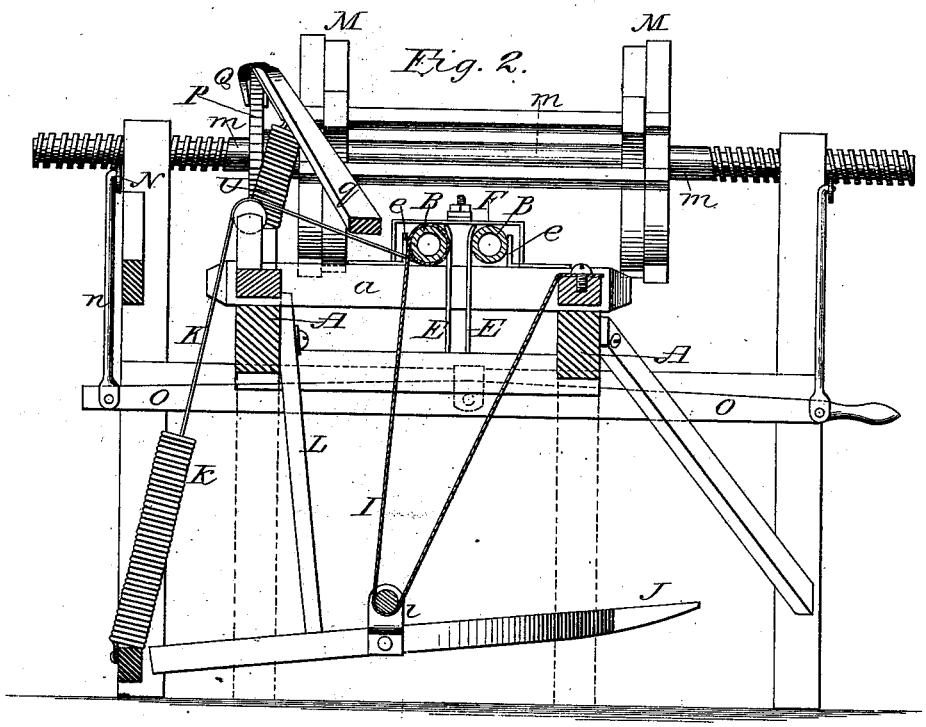
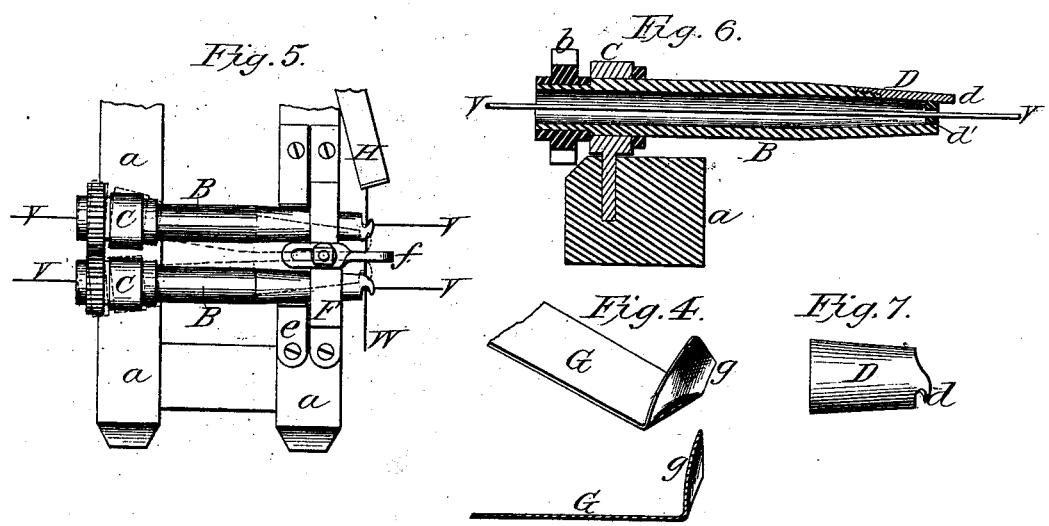

United States Patent Office.

JAMES AYRES AND ALEXANDER C. DECKER, OF BUSHNELL, ILLINOIS, ASSIGNORS TO WASHBURN & MOEN MANUFACTURING COMPANY, OF WORCESTER, MASSACHUSETTS.

MACHINE FOR BARBING WIRE.

SPECIFICATION forming part of Letters Patent No. 235,331, dated December 14, 1880.

Application filed June 14, 1879.

*To all whom it may concern:*

Be it known that we, JAMES AYRES and ALEXANDER C. DECKER, of Bushnell, in the county of McDonough and State of Illinois, have invented certain new and useful Improvements in Machines for Barbing Wires, which are fully described in the following specification, reference being had to the accompanying drawings, in which—

Figure 3:
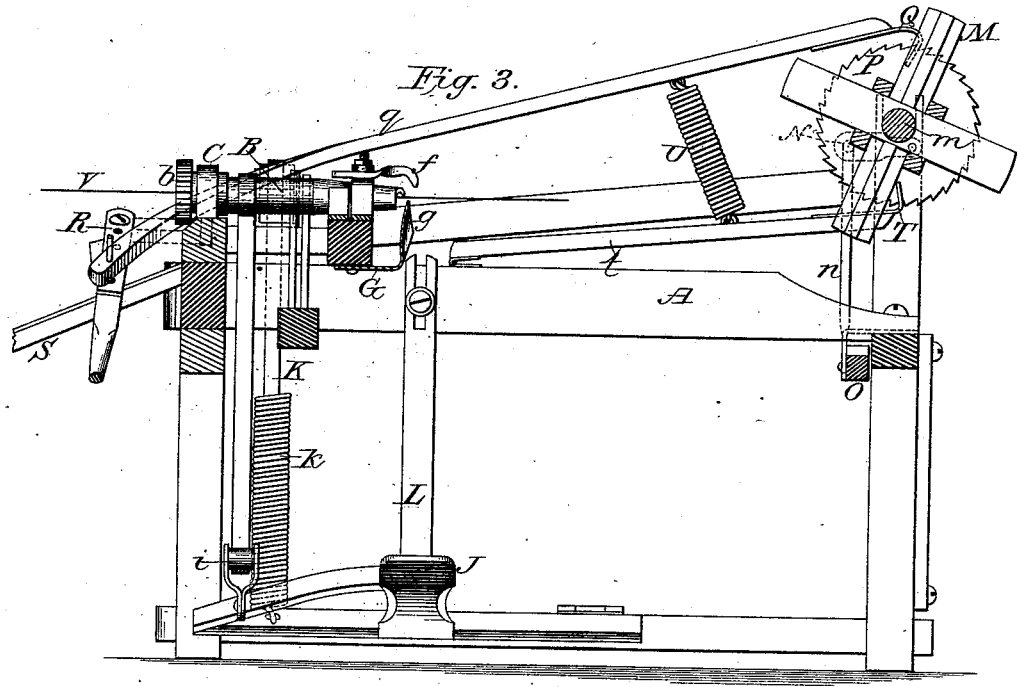
Figure 1:
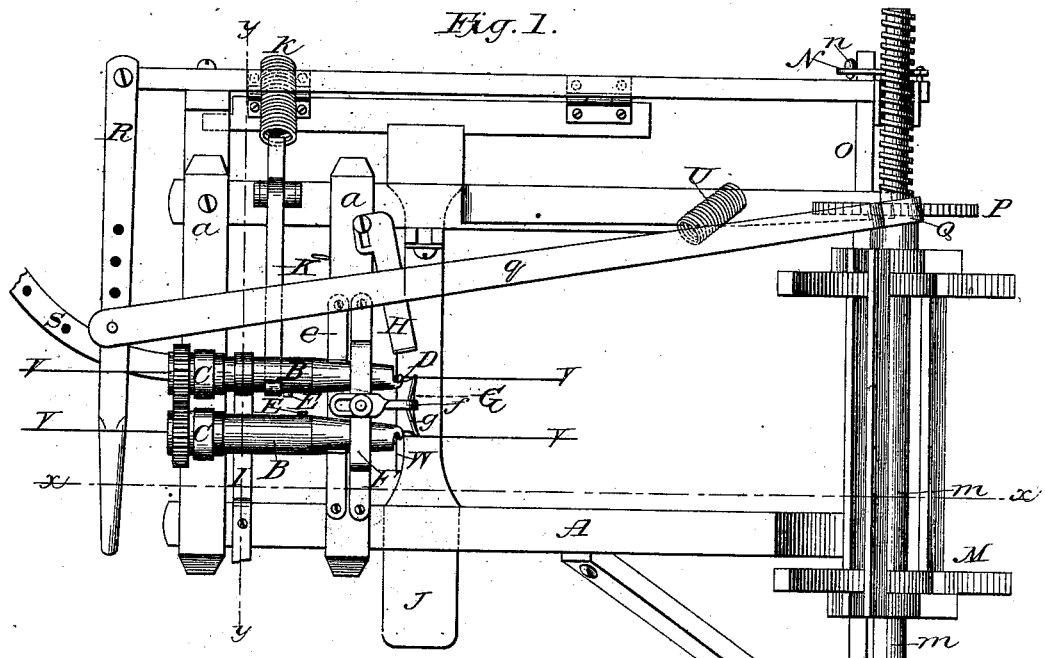

Figure 1 represents a plan view of a barbing-machine embodying our improvements. Fig. 2 represents a transverse section of the machine, taken on line $y\,y$, Fig. 1; Fig. 3, a longitudinal section of the same, taken on the line $x\,x$, Fig. 1. Fig. 4 represents enlarged views of portions of the barbing device, as will be hereinafter more fully described; Fig. 5, a detail plan view on an enlarged scale, showing the barbing-mandrels; Fig. 6, a longitudinal section of one of said mandrels on an enlarged scale; Fig. 7, a side elevation of one of the mandrel-tips detached and on an enlarged scale; and Fig. 8, a section of wire with the barb applied, showing the kind of barb made by this machine.

Our invention relates to a machine for applying to fence-wires the peculiar kind of barb described and shown in a prior application for patent filed by Alexander C. Decker; and the object of the invention is to provide a machine by which the said barb may be applied to the wires automatically. This barb is applied to two wires, the respective ends of the barb being wound once or more around each of the main wires respectively.

The invention consists in a pair of tubular mandrels, through which the main wires are passed, and they are provided with hooks at their tips, by means of which the ends of the barb are caught and wound around the main wires.

It also consists in mounting the mandrels in pivotal bearings at their outer ends, whereby the inner ends are permitted to be drawn together as the ends of the barb are wound about the main wires.

It also consists in various devices and combinations of devices, all of which will be hereinafter fully described, and will be definitely pointed out in the claims.

In the drawings, A represents the main or supporting frame of the machine, on which the various operating devices are mounted. On the upper part of this machine, on cross-beams $a$, are two tubular mandrels, B, the outer ends of which are mounted in bearings C, which are attached to the outer cross-beams $a$ by pivotal supports, as shown in Fig. 6 of the drawings, whereby the mandrels may be vibrated so as to bring their inner ends together or separate them, as may be required. The inner ends of these mandrels are provided with tips D, which are also tubular and attached to the ends of the mandrels by screw-threads or any other suitable means. These tips are mere shells, and their outer ends are closed by steel plugs $d'$, which are drilled sufficiently large to admit the wires to be passed through, and which furnish a hard bearing for the wires as the mandrels are revolved. The two mandrels are arranged side by side, as shown in Fig. 5 of the drawings, and the two curved or hooked lugs on their inner tips are arranged opposite to each other, or, in other words, curved in an opposite direction to each other, as also shown in Fig. 5 of the drawings. A pinion, $b$, is mounted on the outer end of each mandrel, the two pinions meshing together.

A spring or springs, E, are attached to the frame and arranged between the mandrels, so as to operate to separate their inner ends. This may be either a single bent spring or there may be independent springs, each one operating upon one of the mandrels. On the inner beam $a$ two stops, $e$, are arranged on the outside of each of the mandrels, being placed so as to limit the outward vibration of the mandrels under the action of the spring E, so that they are always stopped in the required position. A keeper, F, is also mounted on this same cross-beam, and extends over the mandrels to hold them in place. This keeper also furnishes a support for a guide or stop, $f$, which is attached thereto by a slot and set-screw, and projects inward a little beyond the inner ends of the mandrels, and has its extreme end bent downward and inclined slightly outward, as shown in Fig. 3 of the drawings.

A cam-guide, G, is attached to the under side of the inner cross-beam *a* and projects inward therefrom, its end being bent upward, as shown in Fig. 3 of the drawings. This projection *g* is pointed, and its extremity is arranged to stand between the ends of the mandrels about on a line with their faces. The outer edges of the projection *g* are bent or turned outward from the upper point downward, so that the projection itself is somewhat convex upon its inner face and correspondingly concave upon its outer face.

A gage, H, is arranged on the back side of the inner mandrel, being attached to the inner cross-beam *a* so as to be adjusted back and forth, and is intended to regulate the position of the barbs when placed on the wires, as will be presently described.

The motion of the mandrels required to perform the desired operation is a rotation first in one direction, whereby the barbs are fastened on the main wires, and then in the opposite direction to return them to their proper position of rest. Any suitable mechanism may be employed to produce these movements. We have shown in the drawings a device for accomplishing this, which consists of a strap, I, wound at one end around one of the mandrels, and fastened at the other end to a treadle, J, and carried around a pulley, *i*, on said treadle, and extended up thence and fastened to the frame. When the treadle is depressed it will, of course, rotate the mandrel around which the band is wound, and this, being geared to its companion mandrel, will consequently revolve the latter in an opposite direction. Another strap, K, is wound around the mandrel in an opposite direction to the strap I, and is attached to a spring, *k*, at its outer end, which, in turn, is fastened to the frame. This second strap and spring, it will be seen, will operate in a well-known way to reverse the revolution of the mandrels and return them to their position. The retracting strap and spring may be arranged in any position on the machine which may be found most convenient and practical. The mandrels must stop with the hooked lugs uppermost, as shown in Fig. 2 of the drawings, and it is therefore necessary to provide some means to limit their backward rotation. This we have accomplished by arranging a stop-bar, L, just above the treadle, which limits the upward vibration of the latter, and so stops the return revolution of the mandrels at the proper point. This bar may be made adjustable to regulate the revolution of the mandrels as may be required.

As the barbs are applied to the wire the latter, of course, must be disposed of, and this we accomplish by winding it upon a reel, M, attached to the shaft *m*, mounted in bearings at the end of the machine opposite to the mandrels. On one end of the reel-shaft a right-hand screw-thread is cut, and on the other end a left-hand thread.

A switch, N, is pivoted to each of the standards, supporting the reel-shaft just below the said shaft, so as to engage, respectively, with the screw-threads cut on the ends of the latter, and the link-rod *n* is pivoted to the free end of each of these switches and attached to one end of a lever, O, pivoted at its center to the main frame.

The length of the link-rod *n* is such that when one end of the lever O is thrown up to bring one of the switches into engagement with the screw-thread on the reel-shaft the other switch at the other end of the said shaft will be disengaged. It will be seen from this description that one of the switches will operate, in connection with one of the threaded ends, to cause the reel to travel in one direction, and the other in the other direction, so that by means of these switches and the vibrating lever O the desired travel of the reel is obtained and reversed as necessary to wind the wire regularly upon the reel.

A ratchet-wheel, P, is fastened to the reel-shaft, and a pawl, Q, is arranged to engage with the ratchet-teeth on the upper edge of the wheel. A shaft, *q*, attached to this pawl, extends to the other end of the machine, where it is pivoted to a hand-lever, R, which, in turn, is pivoted to the frame of the machine outside of the mandrels. The vibration outward of this lever will, of course, pull on the pawl and turn the ratchet-wheel and reel a certain distance. This distance is regulated by suitable stops on a segment, S, arranged just below the lever R.

A stop-pawl, T, is arranged to engage with the ratchet-wheel below, and is provided with a shaft, *t*, which is hinged to the main frame.

A spring, U, connects the two pawl-shafts, and causes the pawl to engage with the ratchet-wheel, but at the same time permits the required yielding movement to allow the pawls to pass over the ratchet-teeth when necessary.

The operation of the machine is as follows: A main wire, V, is passed through each of the tubular mandrels. It will be understood, of course, that these wires are fed from spools or reels conveniently arranged with reference to the machine, but which it is not necessary to show here. The barbs W, to be fastened to the wires, are straight pieces of round wire cut on a bevel. The ends of the main wires are drawn through the mandrels, and will therefore be in the position shown in Figs. 1 and 5 of the drawings. A barb, W, is laid upon the main wires just underneath the bent lugs on the inner ends of the mandrels, as shown in Fig. 5 of the drawings. The treadle is in a depressed condition, which rotates the mandrels, as above described, when it is evident that the hooked lugs will catch the respective ends of the barb and carry them around the respective wires V. The edges of the lugs are sharp, so as to bite the barb and prevent slipping, and therefore the barb is wound around the main wires from the point of contact with the lugs inward, or, in other words, the central portion of the barb is wound around the wires, and not the outer ends. This will, of course, continually throw the barb between the two main wires, which is accommodated by the yielding of the inner ends of the mandrels, which are gradually brought together, and when the attachment of the barb is completed will be closed together, as shown in dotted lines in Fig. 5 of the drawings.

If there were nothing to prevent, the outer ends of the barb would be brought together below the mandrels, and the completion of the coil prevented. This is obviated by the cam-guide G. The ends of the barb, as they are carried around by the mandrels, strike against the flaring edges of this cam and are bent inward, so as to pass each other and permit the coiling of the barb around the main wires to be completed. At the same time the depending projection on the end of the gage $f$ takes the body or central portion of the barb and prevents it from springing outward and upward. When a single revolution of the mandrels is completed the barb will be wound around each of the main wires independently, and at the same time the wires drawn close together, presenting the appearance shown in Fig. 8 of the drawings. The treadle is then released and the mandrels are retracted, and at the same time the lever R is moved, rotating the reel and winding the wires thereon, at the same time feeding them the proper distance for the application of another barb.

It will be readily understood that if it is desired to wind the barb more than once around each of the main wires, it is easily accomplished by arranging the parts so as to give more than one revolution to the mandrels, and provide for a sufficient length of barb itself to accommodate the double coil.

It will be understood that the barbs are attached to the main wires in this operation without twisting the latter, which operation we propose to perform on another machine, though twisting mechanism may also be applied to this machine, so as to accomplish the entire operation of barbing and twisting upon the same machine.

In a machine constructed as above described the mandrels have an oscillating movement, but with suitable modification in the form of the coiling-lugs, the revolution of these mandrels may be made continuous, and may be driven automatically, by gearing or otherwise, continuously, instead of being operated by a treadle.

Mechanism may also be attached to the machine for cutting off the barbs, in which case mechanism should also be provided for feeding the barbed wire automatically to the machine.

All of these operations have been accomplished by devices shown in prior patents, which may be applied to this machine without difficulty, and when so applied our machine would be rendered automatic throughout.

Some of the minor devices which have been described above may, of course, be modified, and well-known equivalents substituted therefor, and we do not therefore confine ourselves to all of the specific devices and the specific construction and arrangement of devices which we have described above and shown in the drawings, provided always the main characteristics of our invention are retained.

Having thus described our invention, what we claim as new, and desire to secure by Letters Patent, is—

1. In a machine for barbing wire, two tubular mandrels, arranged parallel to each other, through which the main wires are passed, and provided with a coiling-lug on the tip end of each, in combination with mechanism for rotating the mandrels outwardly from each other and mechanism whereby the mandrels are permitted to move toward each other at their tip ends as the coiling proceeds, substantially as and for the purposes set forth.

2. The tubular mandrels B for the main wires, in combination with the pivotal bearings C, in which the outer ends of the mandrels are mounted, the coiling-lugs $d$ on the inner ends of the mandrels and turned outward from each other, the spring or springs E, stops $e$, and pinions $b$, substantially as described.

3. The coiling-lugs $d$ on the tip ends of the mandrels, curved as described, and provided with a sharp edge to take hold of the barb-wire, substantially as described.

4. The detachable tips D, provided with coiling-lugs $d$, in combination with the mandrel proper, substantially as described.

5. The tubular mandrels B, provided with the coiling-lugs $d$, in combination with the cam-guide G, the edges of which are inclined and flaring, whereby the ends of the barb are turned inward to pass each other as they are carried around by the coiling-lugs, substantially as described.

6. The gage $f$, having its outer end bent downward and inclined or beveled, as described, for guiding and holding the central portion of the barb, substantially as set forth.

7. The mandrels B, geared to each other, as described, in combination with the driving-strap I, treadle J, and elastic retracting-strap K, substantially as described.

8. In a wire-barbing machine, the combination, with mechanism for properly supporting the main wires and feeding them forward at stated intervals, of treadle J, provided with pulley $i$, strap I and its attached mandrel, and stop-bar L, substantially as and for the purposes set forth.

9. In a machine for barbing wire, the combination, with take-up reel M and its shaft $m$, provided with right and left hand screw-threads, of a switch, N, pivoted as described, with means for operating the same, and link-rod n, substantially as and for the purposes set forth.

10. The reel-shaft m, threaded as described, in combination with the pivoted switches N, link-rods n, and centrally-pivoted lever O, substantially as described.

11. The combination, with arm q and pawl Q, of lever R, spring U, segment S, provided with a stop, and hinged bar t, provided with hook T, said parts being constructed and arranged in relation to each other substantially as and for the purposes set forth.

12. The process herein described of coiling a single barb to each of two main wires by coiling it independently to each, consisting in laying the barb across the main wires, arranged parallel to each other, seizing the barb at each end by a coiling device, which prevents slipping, and then coiling the barb around each of the main wires from the ends inward, while at the same time the main wires are gradually permitted to approach each other, substantially as described.

JAMES AYRES.
ALEXANDER C. DECKER.

Witnesses:
JOSEPH B. McCONNELL,
GEORGE W. FOX.